(12) United States Patent
Meyer

(10) Patent No.: US 11,712,865 B2
(45) Date of Patent: Aug. 1, 2023

(54) WEDGE DRIVE HAVING ADJUSTABLE WORKING AND INSTALLATION POSITION

(71) Applicant: Fibro GmbH, Hassmersheim (DE)

(72) Inventor: Markus Meyer, Wangen im Allgäu (DE)

(73) Assignee: Fibro GmbH, Hassmersheim (DE)

( * ) Notice: Subject to any disclaimer, the term of this patent is extended or adjusted under 35 U.S.C. 154(b) by 0 days.

(21) Appl. No.: 17/567,993

(22) Filed: Jan. 4, 2022

(65) Prior Publication Data

US 2022/0325730 A1 Oct. 13, 2022

(30) Foreign Application Priority Data

Apr. 7, 2021 (DE) ...................... 20 2021 101 852.6

(51) Int. Cl.
| | |
|---|---|
| *B30B 1/40* | (2006.01) |
| *B21D 28/32* | (2006.01) |
| *B21D 19/08* | (2006.01) |
| *B21D 37/10* | (2006.01) |

(52) U.S. Cl.
CPC .............. *B30B 1/40* (2013.01); *B21D 28/325* (2013.01); *B21D 19/084* (2013.01); *B21D 37/10* (2013.01); *F16C 2322/14* (2013.01)

(58) Field of Classification Search
CPC ...... B30B 1/40; B21D 28/325; B21D 19/084; B21D 37/10
See application file for complete search history.

(56) References Cited

U.S. PATENT DOCUMENTS

| | | | | | |
|---|---|---|---|---|---|
| 5,904,064 | A | * | 5/1999 | Higuchi | B21D 28/32 72/381 |
| 6,164,115 | A | * | 12/2000 | Higuchi | B21D 28/32 83/588 |
| 2015/0273557 | A1 | * | 10/2015 | Shibata | B21D 28/325 74/567 |
| 2018/0369893 | A1 | * | 12/2018 | Weigelt | B21D 28/325 |

FOREIGN PATENT DOCUMENTS

| | | |
|---|---|---|
| CN | 201287164 Y | 8/2009 |
| DE | 102005044951 A1 | 3/2007 |

OTHER PUBLICATIONS

Extended European Search Report dated May 16, 2022 in corresponding European Application No. 21209938.6.

* cited by examiner

*Primary Examiner* — Dustin T Nguyen
(74) *Attorney, Agent, or Firm* — Harness, Dickey & Pierce, P.L.C.

(57) ABSTRACT

A wedge drive (1) has a slide upper part (4), a slide lower part (2), and a slide (3) arranged between the slide upper part (4) and the slide lower part (2). The slide (3) is movable between a closed and an open position in a working position. The slide (3) has a variable-position device (10), a first stop (30) and second stop (40), to obtain either the working position or an installation position. In the working position, the device (10) is positioned so that it is used as the limiter for the first stop (30) when the wedge drive (1) is actuated or is in its intended fully open position. In the installation position, the device (10) is positioned so that the second stop (40) supports itself on the device (10).

18 Claims, 5 Drawing Sheets

WEDGE DRIVE HAVING ADJUSTABLE WORKING AND INSTALLATION POSITION

CROSS-REFERENCE TO RELATED APPLICATION

This application claims the benefit and priority of German Application No. 20 2021 101 852.6, filed Apr. 7, 2021. The entire disclosure of the above application is incorporated herein by reference.

FIELD

The disclosure relates to a wedge drive, where a working position and an installation position can be effectuated in a simple and cost-effective manner. For example, both aerial cam units and also die mounted cam units can be designed according to the concept of the disclosure as the wedge drive.

BACKGROUND

Various embodiments of wedge drives and cam slide units are already known from the prior art. A wedge drive usually includes a slide upper part, a slide, and a slide lower part. The slide upper part and the slide lower part are each fastened on a pressing tool and guide the slide between them. Thus, the slide is guided during a stroke movement of the pressing tool by the slide upper part and the slide lower part in a stamping or work direction oblique to the stroke direction. The slide is moved and guided between a starting position and an end position. For example, stamping or pressing oblique to the actual stroke direction of the pressing tool is implemented by the movement in the working direction of the wedge drive.

According to the terminology, this setting is the conventional working position of the tool where it is moved and guided from a starting position and an end position.

A guide device is conventionally provided in each case between the slide and the slide upper part and between the slide and the slide lower part. This guides the slide both during an upward stroke and also during a downward stroke of the pressing tool. Sliding plates typically fixed on the slide upper part and the slide lower part are pressed onto sliding plates fixed on the slide during a downward stroke. Thus, the sliding plates press flatly against one another to implement a sliding guide over the entire length of the sliding plates. The slide is moved into the working position by the downward stroke.

When using the wedge drive, however, it is regularly necessary to perform work on the wedge drive when the wedge drive is moved into a so-called "lock-out position."

In this position, which is called the "installation position", according to the terminology of this disclosure, certain conditions have to be met for the use of the tool. The user or worker on the tool is to operate the tool satisfactorily and not perform complex measures to move the tool into the installation position.

In particular, the tool is to be free of tension, so that an existing spring, for example a gas pressure spring, can be removed to execute the work on the tool. In other words, the "installation position" should allow for removal of the gas pressure spring, such that work may be carried out on the tool.

Wedge drives known from the prior art provide an installation position that is effectuated by complex measures. These measures are time-consuming and expensive, and always require an additional component that has to be installed to fix the position.

The disclosure is therefore based on the object of overcoming the above-mentioned disadvantages. The disclosure provides a wedge drive with a device where it is possible to implement both the installation position of the tool and also the working position of the tool.

SUMMARY

This object is achieved by a wedge drive that includes a slide upper part, a slide lower part, and a slide arranged between the slide upper part and the slide lower part. The slide is movable back and forth between a closed position and an open position in a working position via sliding surfaces. The slide is equipped with a variable-position device to produce either the working position or an installation position. A first stop and a separate second stop are on the slide. In the working position of the wedge drive, the device is positioned in relation to the slide so that the device is used as the limiter for the first stop when the wedge drive is actuated or is in its intended fully open position. In the installation position, the device is positioned so that the second stop supports itself on the device.

According to the disclosure, a wedge drive has a slide upper part, a slide lower part, and a slide arranged between the slide upper part and the slide lower part. The slide is movable back and forth in its working position via sliding surfaces between a closed position and an open position. The slide is equipped with a variable-position device to produce either the working position or the installation position. A first stop and a separate second stop are provided on the slide for this purpose. In the working position of the wedge drive, the device is positioned so that it is used as a limiter for the first stop when the wedge drive is actuated. In its intended completely open position, the device is positioned in the installation position so that the second stop supports itself on the device.

It is particularly advantageous that the variable-position device is attachable in a mobile manner on the wedge drive by a fastener for this purpose. A common functional surface, as it were, on the device has both a first function, with the first stop in the working position, and also has a function completely separate therefrom in the installation position together with the second stop. Namely, the fixing of the slide in a defined, in particular, closed position.

In this way, different functions in the tool may be implemented using a single device.

It is particularly advantageous if the device can only be moved from the working position into the installation position in the closed position of the wedge drive.

In one preferred embodiment of the disclosure, the device has a functional surface (a single one for this purpose). In the working position, the functional surface is located directly opposite to the first stop, preferably while forming an air gap. In the installation position, the functional surface is located directly opposite to or pressing against the second stop. In the installation position, the second stop and the functional surface of the variable-position device thus form a bearing for fixing and blocking the slide. For this purpose, the second stop is advantageously located with its stop surface in the closed state of the wedge drive in a shared plane with the functional surface of the variable-position device, furthermore advantageously both in its working position and also the installation position.

It is also advantageous if the functional surface of the device merges into a contact surface, which is preferably in the same plane. Also, the contact surface of the device presses directly or indirectly against an installation surface on the slide upper part or is fastened there both in the working position and also in the installation position.

In a similarly advantageous embodiment of the disclosure, the first stop is arranged offset in relation to the second stop viewed in the movement direction of the slide relative to the slide upper part. Preferably, it is offset by exactly the same distance that the first stop covers during its movement from the closed position to the open position of the wedge drive in the actuation direction of the slide.

Furthermore, it is advantageous if the functional surface forms the variable-position device completely or at least a partial surface that is oriented in a plane parallel to those surfaces that the contact surface forms with the functional surface at the first and/or second stop.

In a further preferred embodiment of the disclosure, the variable-position device comprises a fastener and a single fastening opening for this fastener that are used to obtain both the working position and also the installation position.

In an advantageous manner, two tool-side fasteners are spatially separated from one another (for example, arranged one below the other). They are preferably formed as pocket holes with thread for fastening the device on the slide upper part, where the device may be fastened alternately on the one or the other fastener by a detachable fastener to obtain the working position or the installation position. The device can therefore be fastened either on the upper or lower hole. Thus, either a first function (working position with end stop) and a second function (installation position for slide fixing) can be implemented using a single device.

In a further preferred embodiment of the disclosure, a spring or gas pressure spring actuates the wedge drive. The device is installed relative to the gas pressure spring so that the gas pressure spring or springs, in general, can be removed from the wedge drive in the installation position of the device.

Furthermore, it is advantageous if an air gap is deliberately provided in the working position in the intended use in the completely open position of the wedge drive between the device and the first stop. Preferably, an elastic cushion extends at least partially from the stop in the direction of the device to the air gap or comes into contact on the device. This means that the configuration can be performed so that the first stop surface does not necessarily have to press against the functional surface of the variable-position device in the open state of the wedge drive. Rather, it can also be located directly opposite to it, but a narrow air gap remains between them. The cushion also prevents damage occurring on the opposing surfaces.

The features disclosed above may be combined as needed, if this is technically feasible, and these features are not inconsistent with one another, even if this is not explained in detail in all combinations.

Further areas of applicability will become apparent from the description provided herein. The description and specific examples in this summary are intended for purposes of illustration only and are not intended to limit the scope of the present disclosure.

DRAWINGS

Other advantageous refinements of the disclosure are characterized in the dependent claims or are described in more detail hereinafter together with the description of the preferred embodiment of the disclosure on the basis of the figures. In the figures:

DETAILED DESCRIPTION

Figure 1:
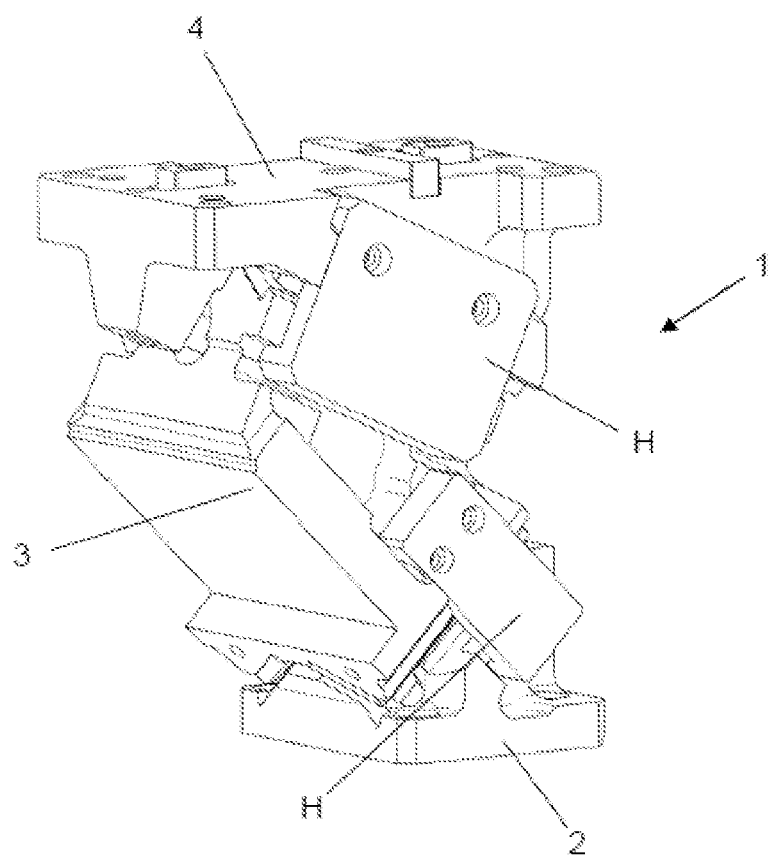
FIG. 1 is a perspective isometric view of a wedge drive.

The disclosure is explained in more detail hereinafter on the basis of an exemplary embodiment with reference to FIGS. 1 to 5. The figures are schematic examples. Identical reference numerals in the figures represent identical functional and/or structural features.

Figure 2:
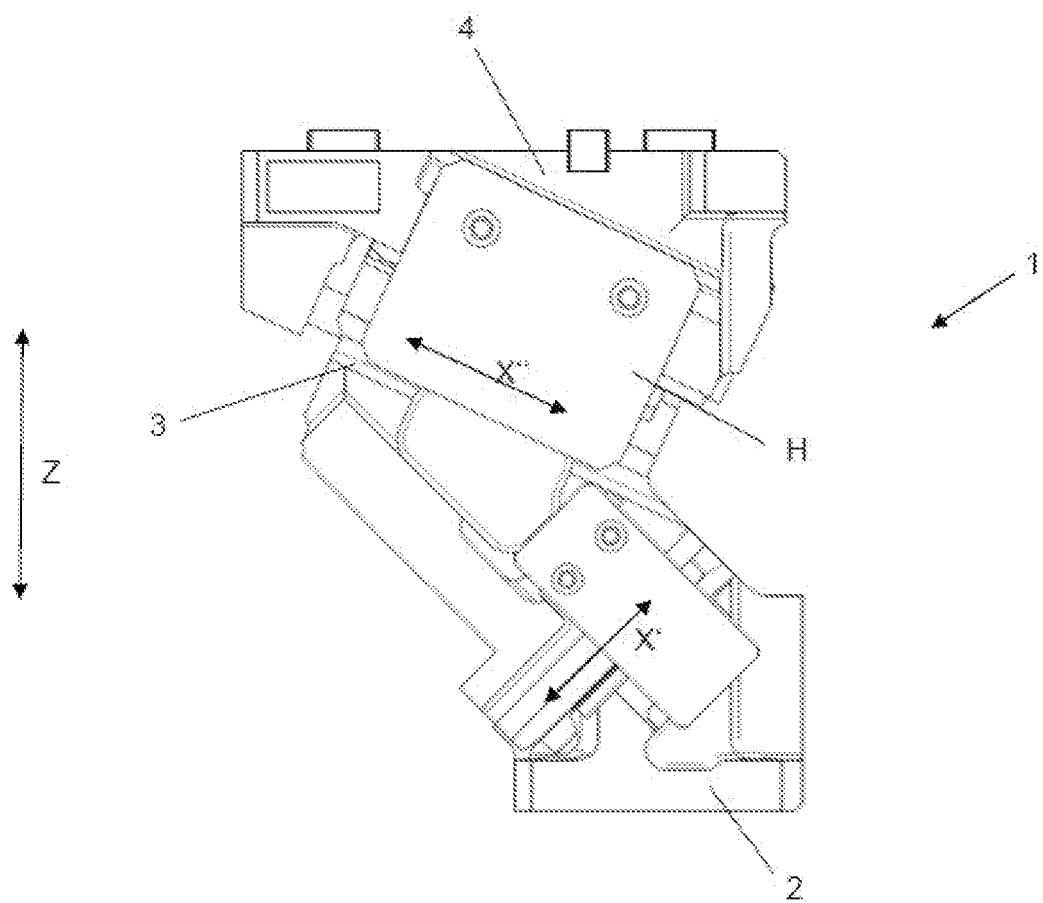
FIG. 2 is a side elevation view of the wedge drive of FIG. 1.

FIG. 1 is a perspective isometric view of a first wedge drive 1. FIG. 2 is a side elevation view of FIG. 1. The stroke direction Z, along which the slide upper part 4 and the slide lower part 2 with the slide 3 are moved toward or away from one another, is shown in each case by an arrow. A guide device is between the slide upper part 4 and the slide 3 and between the slide lower part 2 and the slide 3, respectively. The guide device between the slide upper part 4 and the slide 3 is designed as a main guide device with a holding clamp H. The guide device between the slide lower part 2 and the slide 3 is designed as a positive return device with a holding clamp H.

The respective holding clamps H are used for positive guiding in the respective sliding direction X', X", as shown.

Figure 3:
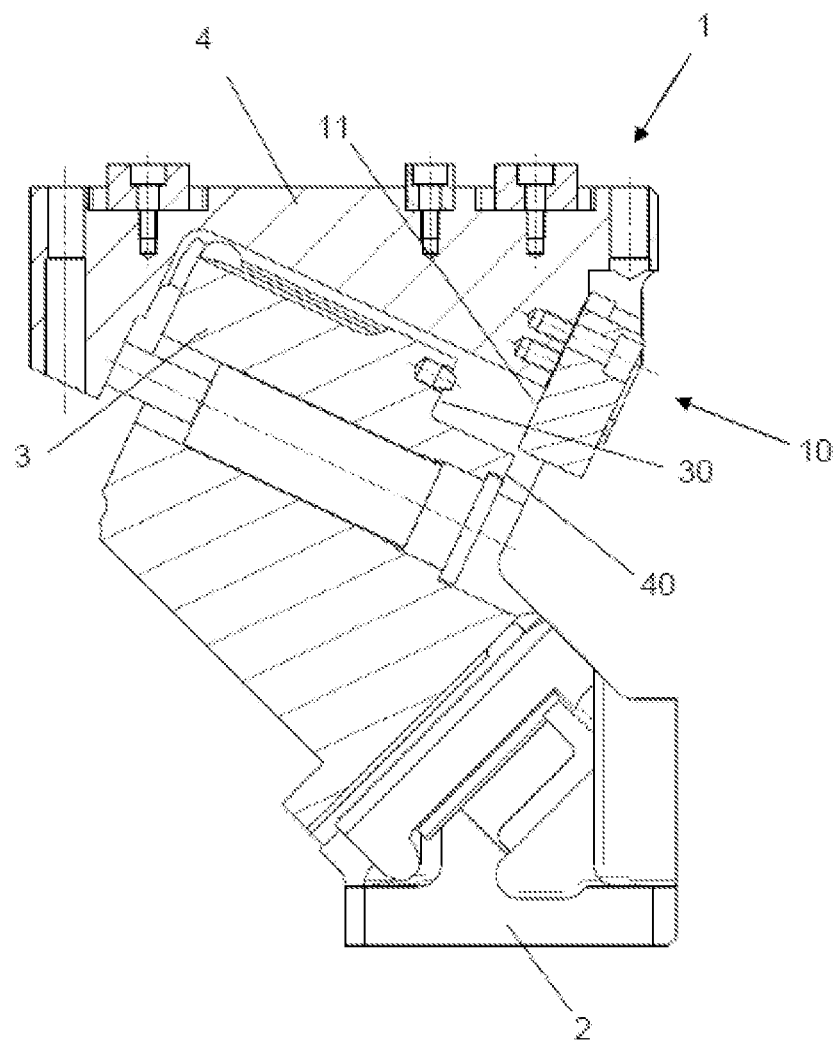
FIG. 3 is a cross-section view through the wedge drive in the closed position (working position).
Figure 4:
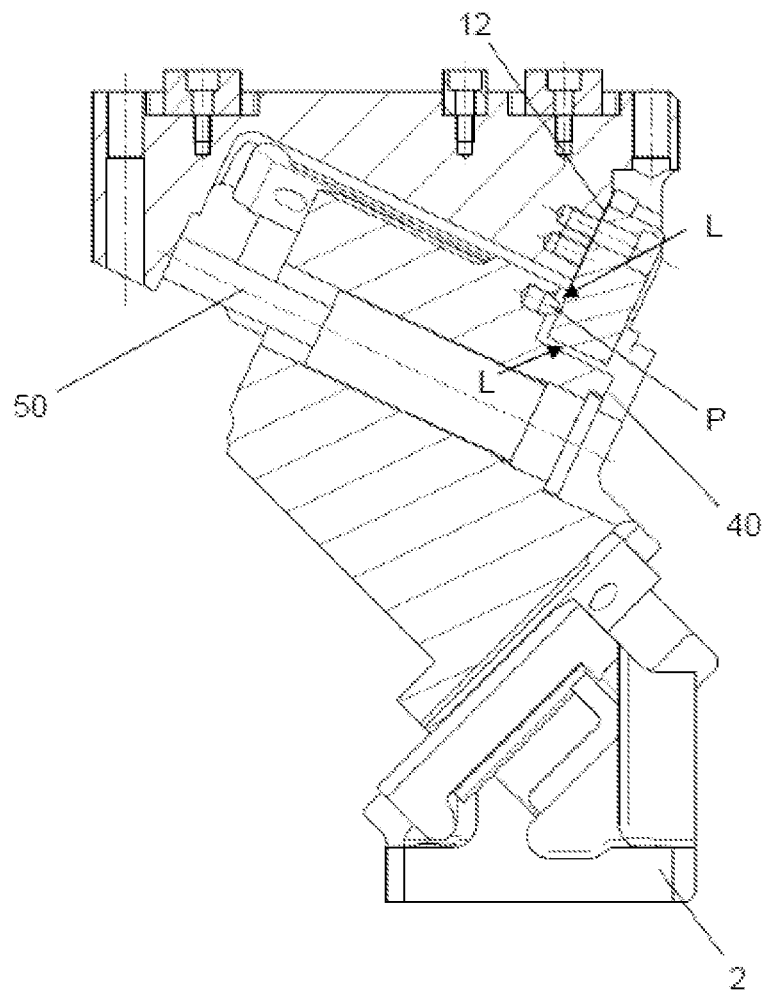
FIG. 4 is a cross-section view through the wedge drive in the open position (working position).

FIGS. 3 and 4 show the wedge drive 1 in a sectional view in its respective working position. FIG. 3 shows a section through the wedge drive 1 in the closed position (working position). FIG. 4 shows a section through the wedge drive 1 in the (completely) open position (working position) at the end of a stroke in the Z direction of the wedge drive 1.

The wedge drive 1 thus has the slide upper part 4, the slide lower part 2, and the slide 3 arranged between the slide upper part 4 and the slide lower part 2. The slide 3 is movable in a working position via sliding surfaces between a closed (FIG. 3) and an open position (FIG. 4). The slide 3 is equipped with a variable-position device 10 to obtain either the working position or an installation position.

The slide 3 has a first stop 30 and a separate second stop 40 offset in the movement direction X". The stops 30 and 40 are accordingly located offset in parallel planes by approximately the displacement of the slide 3 in the direction X" during a complete stroke.

In the working position of the wedge drive 1, the device 10 is positioned as shown in FIGS. 3 and 4. Namely, it is fixed on the upper fastening opening in the drawing by a screw.

In this position, the device 10, having its functional surface 11, is used as a limiter for the first stop 30. Thus, the slide 3 moves in the actuation direction X".

This means that the wedge drive 1 cannot be opened further in its intended fully open position, as shown in FIG. 4, since the first stop 30 runs up against the functional surface 11. In the working position in the intended use in the fully open position of the wedge drive 1, an air gap L is provided between the device 10 and the first stop 30, as can also be seen in FIG. 4. An elastic cushion P is provided at the stop 30, which extends into the air gap L and is used as protection for the corresponding surfaces.

Figure 5:
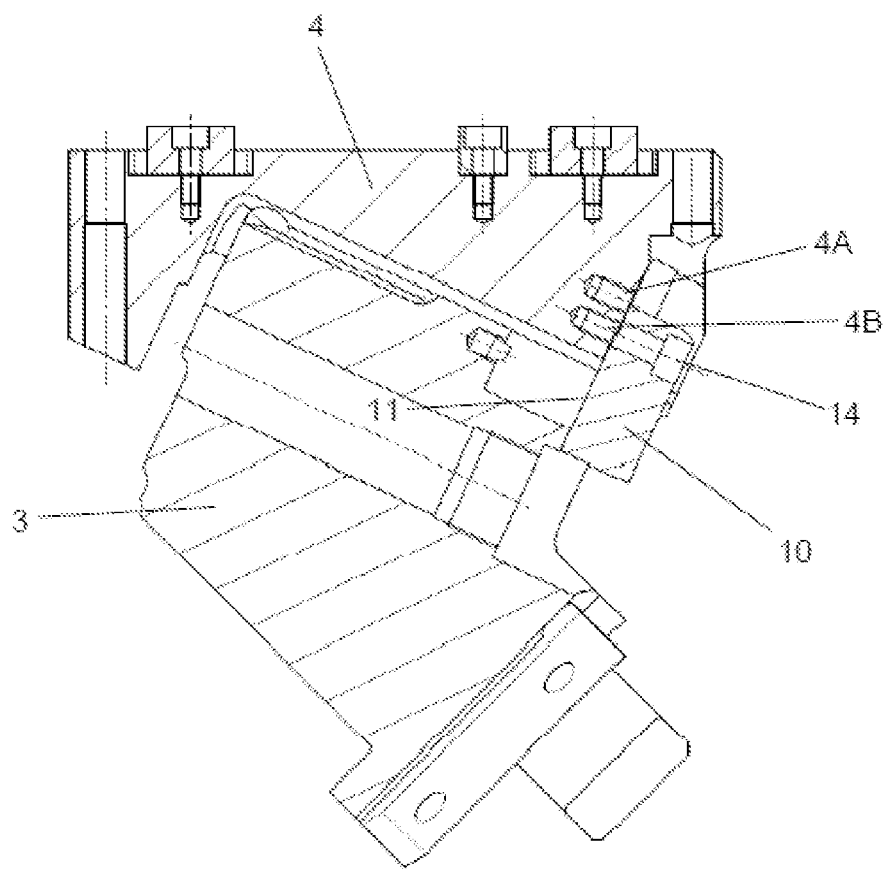
FIG. 5 is a cross-section view through the wedge drive in the installation position.

In contrast, in the installation position, the device 10 is positioned as shown in FIG. 5. Here, the second stop 40 supports itself directly on the device 10. In other words, the stop 40 forms a first bearing and the functional surface 11 of the device 10 forms a corresponding counter bearing. The slide 3 is now fixed so that work can be carried out on the wedge drive 1.

One special feature, however, is that the gas pressure spring 50, provided for actuating the wedge drive, can be removed from the wedge drive 1 in the installation position of the device 10.

The functional surface 11 of the device 10 leads directly to the contact surface 12. The contact surface 12 presses directly against a corresponding installation surface on the slide upper part 4 both in the working position and in the installation position of the device 10, as is visible in FIGS. 3 to 5.

According to the concept of the disclosure, the variable-position device 10 is fastened via a (single) fastener 14 and a single fastening opening in the device 10. In this case, an installation block 10. Thus, no separate (in particular external additional) fasteners are required if one wishes to install the device 10 from its working position into the installation position (or vice versa).

For this purpose, two pocket holes are provided for fastening the device 10 on the slide upper part 4. The two pocket holes are spatially separated from one another and include threads 4A, 4B. Thus, the device 10 may alternately be fixed on one or the other pocket hole 4A, 4B by a screw 14 to obtain the working position or the installation position. Furthermore, it can be provided that the device 10 also fixes the slide 3, for example, by a screw connection or an alternative suitable fixing connection.

The disclosure is not limited in its embodiment to the preferred exemplary embodiments specified above. Rather, a number of variants is conceivable, which make use of the described solution even in fundamentally differently designed embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wedge drive comprising:
a slide upper part, a slide lower part, and a slide arranged between the slide upper part and the slide lower part, the slide is movable back and forth between a closed position and an open position in a working position via sliding surfaces;
the slide equipped with a variable-position device to produce either the working position or an installation position;
a first stop and a separate second stop are on the slide, wherein in the working position of the wedge drive, the device is positioned in relation to the slide so that the device is used as the limiter for the first stop when the wedge drive is actuated or is in its fully open position, and wherein in the installation position, the device is positioned so that the second stop supports itself on the device.

2. The wedge drive as claimed in claim 1, where the device can be moved from the working position into the installation position only in the closed position of the wedge drive.

3. The wedge drive as claimed in claim 1, wherein the device has a functional surface, in the working position the functional surface is directly opposite the first stop, forming an air gap, and in the installation position, the functional surface is located directly opposite or pressing against the second stop.

4. The wedge drive as claimed in claim 3, wherein the functional surface of the device merges into a contact surface, that lies in the same plane, and the contact surface presses directly or indirectly against an installation surface on the slide upper part both in the working position and in the installation position.

5. The wedge drive as claimed in claim 3, wherein the functional surface forms all or at least part of a surface that is oriented in a plane parallel to surfaces forming the contact surface with the functional surface at the first and/or second stop.

6. The wedge drive as claimed in claim 1, wherein the first stop is arranged offset in relation to the second stop, as viewed in the movement direction of the slide relative to the slide upper part.

7. The wedge drive as claimed in claim 1, wherein the variable-position device comprises a fastener and a single fastener opening, which are used to obtain both the working position and the installation position.

8. The wedge drive as claimed in claim 1, wherein an air gap is provided in the working position in the fully open position of the wedge drive between the device and the first stop, and an elastic cushion extends at least partially from the first stop in a direction going toward the device into the air gap or comes into contact with the device.

9. The wedge drive as claimed in claim 1, wherein for fastening the device, either:
a) one fastener opening is provided on the device and two spatially separated fasteners openings are provided on the slide upper part, or
b) two spatially separated fastener openings are provided on the device and one fastener opening is provided on the slide upper part; and
wherein the fastener openings on the slide upper part are formed as pocket holes with threads, and
wherein the device may be fastened to the upper slide part by a detachable fastener using one of the two spatially separated fastener openings to obtain the working position or the installation position.

10. A wedge drive comprising:
a slide upper part, a slide lower part, and a slide arranged between the slide upper part and the slide lower part, the slide is movable back and forth between a closed position and an open position in a working position via sliding surfaces;
the slide equipped with an installation block with adjustable portions to produce either the working position or an installation position;
a first stop and a separate second stop are on the slide, wherein in the working position of the wedge drive, the installation block is positioned in relation to the slide so that the installation block is used as the limiter for the first stop when the wedge drive is actuated or is in its fully open position, and wherein in the installation position, the installation block is positioned so that the second stop supports itself on the installation block.

11. The wedge drive as claimed in claim 10, where the installation block can be moved from the working position into the installation position only in the closed position of the wedge drive.

12. The wedge drive as claimed in claim 10, wherein the installation block has a functional surface, in the working position the functional surface is directly opposite the first stop, forming an air gap, and in the installation position, the functional surface is located directly opposite or pressing against the second stop.

13. The wedge drive as claimed in claim 12, wherein the functional surface of the installation block merges into a contact surface, that lies in the same plane, and the contact surface presses directly or indirectly against an installation surface on the slide upper part both in the working position and in the installation position.

14. The wedge drive as claimed in claim 12, wherein the functional surface forms all or at least part of a surface that is oriented in a plane parallel to surfaces forming the contact surface with the functional surface at the first and/or second stop.

15. The wedge drive as claimed in claim 10, wherein the first stop is arranged offset in relation to the second stop, as viewed in the movement direction of the slide relative to the slide upper part.

16. The wedge drive as claimed in claim 10, wherein the installation block comprises a fastener and a single fastener opening, which are used to obtain both the working position and the installation position.

17. The wedge drive as claimed in claim 10, wherein an air gap is provided in the working position in the fully open position of the wedge drive between the device and the first stop, and an elastic cushion extends at least partially from the first stop in a direction going toward the device into the air gap or comes into contact with the device.

18. The wedge drive as claimed in claim 10, wherein for fastening the installation block, either:
   a) one fastener opening is provided on the installation block and two spatially separated fasteners openings are provided on the slide upper part, or
   b) two spatially separated fastener openings are provided on the installation block and one fastener opening is provided on the slide upper part; and wherein the fastener openings on the slide upper part are formed as pocket holes with threads, and wherein the installation block may be fastened to the upper slide part by a detachable fastener using one of the two spatially separated fastener openings to obtain the working position or the installation position.

* * * * *